US010020900B2

(12) United States Patent
Neel et al.

(10) Patent No.: US 10,020,900 B2
(45) Date of Patent: Jul. 10, 2018

(54) APPARATUS AND METHOD FOR PROVIDING SPECTRUM INFORMATION USING SPECTRUM-RELATED FUNCTIONS

(71) Applicant: FEDERATED WIRELESS, INC., Arlington, VA (US)

(72) Inventors: James Neel, Lynchburg, VA (US); Salvador D'Itri, Arlington, VA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 0 days.

(21) Appl. No.: 15/172,556

(22) Filed: Jun. 3, 2016

(65) Prior Publication Data
US 2017/0353249 A1 Dec. 7, 2017

(51) Int. Cl.
*H04B 17/30* (2015.01)
*H04B 17/23* (2015.01)
*H04B 17/309* (2015.01)

(52) U.S. Cl.
CPC ............ *H04B 17/30* (2015.01); *H04B 17/23* (2015.01); *H04B 17/309* (2015.01)

(58) Field of Classification Search
CPC ...... H04W 16/14; H04W 24/10; H04B 17/30; H04L 27/0006; H04H 60/41
See application file for complete search history.

(56) References Cited

U.S. PATENT DOCUMENTS

2003/0110445 A1* 6/2003 Khaleque .............. G06F 9/4443
715/222
2003/0206130 A1* 11/2003 Husted ................... G01S 7/021
342/57

(Continued)

*Primary Examiner* — Devan Sandiford
(74) *Attorney, Agent, or Firm* — Finnegan, Henderson, Farabow, Garrett & Dunner, LLP (57) ABSTRACT

An improved system architecture for making spectrum information available to one or more devices and for providing and using the spectrum information at a device. The improved architecture employs an arrangement of software processes that interact to provide a flexible and highly-configurable technique for controlling access to spectrum information. To that end, a spectrum information server executes a server process having a library of spectrum-related functions including, for example, functions for retrieving spectrum data from spectrum data sources and/or for processing retrieved spectrum data. The spectrum information server also executes one or more device host processes configured to communicate with at least one compatible device process executing on a spectrum-aware (SA) device. In an illustrative embodiment, a device process on the SA device may request spectrum information from a device host process on the spectrum information server. The device host process receives the request and may generate a function call that it sends to the server process, which executes an associated function from its library of spectrum-related functions. The execution of the function may cause the server process to retrieve certain spectrum data from a spectrum data source. The server process may return the retrieved spectrum data to the device host process, which in turn sends the requested spectrum information to the device process for presentation to a user.

32 Claims, 6 Drawing Sheets

(56) References Cited

U.S. PATENT DOCUMENTS

| | | | | |
|---|---|---|---|---|
| 2009/0052574 A1* | 2/2009 | Li | ............... | H04L 1/0001 |
| | | | | 375/296 |
| 2014/0274184 A1* | 9/2014 | Regan | ............... | H04W 48/16 |
| | | | | 455/515 |
| 2014/0342673 A1* | 11/2014 | Edmans | ............... | H04K 3/822 |
| | | | | 455/67.11 |
| 2016/0014613 A1* | 1/2016 | Ponnampalam | ...... | H04W 16/18 |
| | | | | 370/254 |
| 2016/0316422 A1* | 10/2016 | Regan | ............... | H04W 48/16 |

* cited by examiner

APPARATUS AND METHOD FOR PROVIDING SPECTRUM INFORMATION USING SPECTRUM-RELATED FUNCTIONS

FIELD OF INVENTION

The present invention relates to spectrum information systems and, more particularly, to apparatuses and methods for making spectrum and spectrum-derived information available to one or more devices and for providing and using the spectrum information at a device.

BACKGROUND

The radio-frequency (RF) spectrum is the foundation for many wireless communications systems in use today, including cellular networks. Specified frequency ranges, sometimes called bands, in the RF spectrum may be allocated for use by different entities, for different purposes, or in different geographic locations. As used in this disclosure, "spectrum" refers to any frequencies and frequency bands in the RF spectrum that may be used or allocated for wireless communications. "Spectrum data" refers to any data that is related to spectrum.

Therefore, having access to spectrum data is important to the maintenance and operation of wireless communications systems. For example, spectrum data may be used to determine whether a mobile device's poor connectivity is due to the malfunctioning device or due to interference in the environment. Further, because of the ubiquity of wireless systems and their intertwinement with every-day life, spectrum data correlates with phenomena of interest to many people beyond spectrum managers and network engineers. For example, a store floor manager may wish to optimize product layout based on the patterns of customer movement that can be inferred from the changing locations of the RF emitted by their mobile devices. In another example, a family driving on a vacation may wish to know where the next available accessible hotspot is to stop to download another movie for the car while having lunch.

While many different commercial and government entities may employ proprietary systems for collecting, accessing, and managing spectrum data, this data is currently unavailable to third parties for custom applications. Further, even if they had access to the required spectrum data, these users typically would not have the expertise or necessary infrastructure to effectively interpret the data or apply the spectrum data to their specific problem. In particular, support infrastructure has been estimated to account for up to 50% of the total cost of network ownership associated with managing the use of shared spectrum.

SUMMARY

The disclosed embodiments of the invention provide an improved system architecture for making spectrum information available to one or more devices and for providing and using the spectrum information at a device. As used herein, "spectrum information" includes spectrum data and any information derived from spectrum data. Spectrum information may include, for example: measured data, processed data, filtered data, and any other types of information relating to spectrum allocation or use. The system architecture in the disclosed embodiments enables third-party software developers to access and use spectrum information based on spectrum data that was previously only accessible through proprietary sources, such as through government or military sources. The improved architecture employs an arrangement of software processes that interact to provide a flexible and highly-configurable technique for enabling controlled access to spectrum information. In this context, a "process" refers to any executable software program, script, or application. The disclosed embodiments further illustrate an exemplary spectrum-aware ("SA") device that can be configured to access and use spectrum information using the improved system architecture. As used herein, a SA device is any device that uses spectrum information.

In accordance with the disclosed embodiments, a spectrum information server can access spectrum data stored in one or more spectrum data sources. A "spectrum data source" is any system, device, or software that is capable of providing spectrum data. The spectrum data sources may comprise at least one local or remote database that can be queried by the server. The spectrum data sources may store various types of spectrum data, including for example spectrum usage data, spectrum map data, spectrum measurement data, spectrum allocation data, signal identification data, user identification data associated with spectrum usage or allocation, and other spectrum-related information and statistics that would be apparent to a person of ordinary skill in the art. The spectrum information server executes a server process having a library of spectrum-related functions including, for example, functions for retrieving spectrum data from the spectrum data sources and/or processing the retrieved spectrum data.

In the disclosed embodiments, one or more SA devices communicate with the spectrum information server over a network, such as the Internet. The SA devices may, for example, query the spectrum information server for specific types of spectrum information, send one or more RF measurements, and/or send other requests or messages to the server, and receive corresponding responses. The spectrum information server executes one or more SA device host processes, and each SA device executes a SA device process that is configured to communicate with at least one of the SA device host processes on the server. For example, a SA device process may send a request for spectrum information to one of the SA device host processes and receive a response from that SA device host process including the requested spectrum information. According to the disclosed embodiments, a one-to-one assignment of SA device host processes (on the server) to SA device processes (on the SA devices) is not required, and a single SA device host process preferably may communicate with one or more compatible SA device processes.

In an illustrative embodiment of the invention, a SA device process executing on a SA device may request spectrum information from a SA device host process executing on the spectrum information server. The SA device host process receives the request and may generate a function call (and any related data or parameters associated with the function call) that it sends to the server process executing on the spectrum information server. The SA device host process may generate the function call based on the contents of the received request for spectrum information. In some embodiments, the SA device host process may generate the function call based on other stimuli such as a SA device user's action or other capabilities specific to the SA device. The server process receives the function call and executes a corresponding function from its library of spectrum-related functions. The execution of the function may cause the server process to request certain spectrum data from a spectrum data source. In this embodiment, the spectrum data source retrieves the requested spectrum data and returns it to the server process, which in turn may provide the spectrum data (or a processed form of the spectrum data) to the SA device host process that sent the function call. After receiving the spectrum data from the server process, the SA device host process may further process the spectrum data, possibly invoking additional calls to functions in the server process's library, to generate the spectrum information to return to the SA device process. In some embodiments, the spectrum information returned to the SA device process may comprise at least some of the spectrum data retrieved by the server process without any additional processing. The SA device process may provide the spectrum information to an application executing on the SA device. Additionally, or alternatively, the SA device process may generate and display one or more signals or values representing the spectrum information for display to a user of the SA device.

A SA device may be specially designed for requesting and displaying spectrum information in accordance with the disclosed embodiments. The SA device may comprise limited or specialized processing and display capabilities for providing spectrum information to a user. To reduce its processing requirements, a SA device process executing on the SA device may send requests to SA device host processes that leverage the spectrum-related functions available through the library of functions on the spectrum information server. In this manner, the SA device process can receive spectrum information that has already been processed into a format that may be easily presented to the user. The SA device may include various user-interface elements such as a text display, a meter display, at least one button, and a speaker. In some embodiments, the SA device may include output components (such as displays) that may be removable and/or interchangeable by a user. In such embodiments, each interchangeable component may be optimized for displaying a certain type of spectrum information. For example, a user of the SA device may interchange an existing output component with a text display, when the user configures the SA device to output text-based spectrum information. The SA device also may include other components including, for example, a controller, a compass, a GPS transceiver, a network interface, an antenna, a memory device, a DFT chip, a matched filter, an RFIC, and a USB or other local data-transfer interfaces.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION OF EMBODIMENTS OF THE INVENTION

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

The embodiments of the invention described herein provide an improved system architecture for making spectrum information available to one or more devices and for providing and using the spectrum information at a device. The disclosed embodiments enable third-party software developers to access and use spectrum information based on spectrum data that was previously only accessible through proprietary sources. Advantageously, the use of spectrum data in the disclosed embodiments is not limited to proprietary systems designed only for particular spectrum-aware (SA) devices or specific applications. For example, the improved system architecture may be used in conjunction with a Spectrum Software Development Kit (SDK), which enables developers to build custom SA devices and applications that provide intuitive, actionable spectrum information to users who may not have the necessary expertise to effectively use the raw spectrum data. The improved architecture also has the advantage that it does not require extensive spectrum-data processing at a SA device.

As discussed in more detail below, the disclosed embodiments of the invention employ an arrangement of software processes that interact to provide a flexible and highly-configurable technique for enabling controlled access to spectrum information. Specifically, the disclosed spectrum information system may collect spectrum data from various, diverse sources and provide some, none, or all available spectrum information to spectrum-aware devices based on the privileges of the users and the data protection policies. The disclosed embodiments further illustrate an exemplary SA device that can be configured to access and use spectrum information using the improved system architecture.

Figure 1:
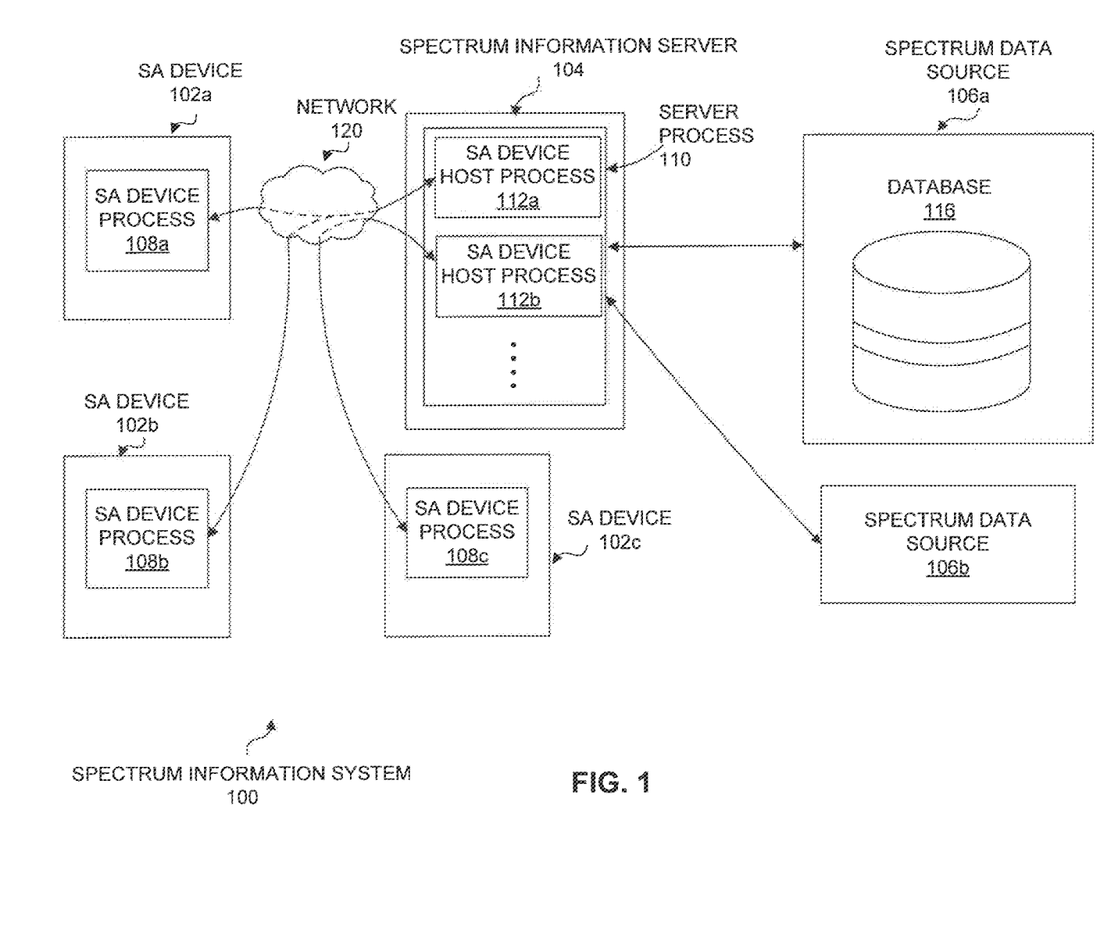
FIG. 1 illustrates an exemplary spectrum information system that may be used according to the disclosed embodiments of the invention.

FIG. 1 illustrates an exemplary spectrum information system 100 that may be used in accordance with the disclosed embodiments of the invention. The spectrum information system 100 includes one or more SA devices 102a, 102b, and 102c, a spectrum information server 104, a network 120, and one or more spectrum data sources 106a and 106b.

As shown in FIG. 1, the SA devices 102a-c may communicate with the spectrum information server 104 over the network 120. Various types of networks may be used, including public and private networks, using either wireless or wired communication channels. In some embodiments, for example, each SA device 102a-c may communicate with the server 104 over the Internet 120. The spectrum information server 104 also may communicate with one or more local or remote spectrum data sources 106a and 106b, at least some of which may be accessible over the network 120 or a different network or implemented at the server 104. A person of ordinary skill in the art will understand that communications between system elements in the disclosed embodiment may involve use of one or more communications protocols (e.g., TCP/IP, UDP, and REST) and/or data formats (e.g., XML, encoded binary, and 1900.5).

Each spectrum data source 106a and 106b may include a database 116 storing spectrum data, which may reside on a separate computer system. In some embodiments, the spectrum database 116 may be a custom database designed to organize spectrum data and other information, or alternatively, the spectrum database 116 may be a database built and/or maintained by a third party, such as the Global Electromagnetic Spectrum Information System (GEMSIS). In another example, spectrum data source 106b may be a spectrum-access system (SAS), such as a 3550 MHz SAS. In some embodiments, a spectrum data source may include a cognitive engine.

Each SA device 102a-c in FIG. 1 may be a general-purpose device, such as a smartphone, tablet, or laptop, configured to execute a spectrum-related application, i.e., an application that uses spectrum information, such as to monitor, manage, or control usage or allocation of spectrum. Alternatively, at least one of the SA devices 102a-c may be a custom-built device for a specific spectrum-related application. For example, in an exemplary embodiment, the SA device 102a may be a smartphone and the SA device 102b may be a custom-built device for military personnel working in a hazardous environment or combat zone. In this example, the SA device 102c may be a tablet device.

The SA devices 102a, 102b, and 102c each includes at least one processor (not shown) capable of executing a SA device process 108a, 108b, and 108c. Each SA device process 108a-c is a software process configured to obtain spectrum information from the spectrum information server 104. In one example, the SA device process 108a may be a custom, downloadable application configured to execute on a smartphone SA device 102a. By way of further example, the SA device process 108b may be a custom software program configured to execute on a corresponding custom-built SA device 102b. In yet another example, the SA device process 108c may be a web application that can be launched from a web browser running on a tablet SA device 102c. The SA device processes 108a-c are not limited to these specific examples, and may include any software programs configured to obtain and use spectrum information using the improved system architecture and methods disclosed herein.

The spectrum information server 104 may include one or more physical computers. In some embodiments, the spectrum information server may be implemented as a virtual machine executing on one or more computers. For example, the spectrum information server 104 may be a virtual machine running on a cloud platform, such as Amazon EC2. Further to the disclosed embodiments, a server process 110 is configured to execute on the spectrum information server 104. The spectrum information server executes the server process 110 on at least one processor (not shown), and also uses other computer hardware, such as memory and network interface components, that would be understood to a person of ordinary skill in the art. The memory, for example, may be configured to store the software programs, scripts, or applications corresponding to the server process 110 and SA device host processes 112a and 112b, and a library of spectrum-related functions as described in more detail below.

In the disclosed embodiments, one or more SA device host processes 112a and 112b are configured to execute on the spectrum information server 104. In the embodiment shown in FIG. 1, for example, SA device host processes 112a and 112b are configured to execute within the server process 110. The server process 110 is allocated its own resources, such as memory and processing time, within the server 104. In this embodiment, the server process 110 may provide a sandbox environment for each of the SA device host processes 112a and 112b to execute within. In this context, a "sandbox environment" is a software environment where access to computing resources, such as memory, network, and application programming interfaces (API), are controlled by another process. For example, in the illustrative embodiment shown in FIG. 1, each of SA device host processes 112a and 112b may be running in its own sandbox environment in which access to resources is controlled by the server process 110. A sandbox environment may also control communications between the SA device host processes 112a, b. In other embodiments (not illustrated in FIG. 1), the SA device host processes 112a and 112b may be configured to execute on the spectrum information server 104 in the same manner as the server process 110, i.e., as stand-alone processes. In these alternate embodiments, the server process 110 may not control the SA device host processes' access to resources on the server.

In operation, a SA device host process 112a or 112b may communicate with one or more of SA devices 102a-c executing a compatible SA device process 108a-c. For example, in FIG. 1, the SA device host process 112a may communicate with SA device processes 108a and 108b, even though the SA device processes 108a and 108b are not identical processes and do not run on the same type of SA device. Yet, the communication is possible because the SA device processes 108a and 108b are programmed and/or configured to be compatible with the SA device host process 112a. In another example, the SA device host process 112a may not communicate with SA device process 108c because SA device host process 112a and SA device process 108c are not compatible. Instead, in this example, the SA device host process 112b may be programmed and/or configured to communicate with the SA device process 108c.

In some embodiments, the server process 110 includes at least one library of functions that can be called by the SA device host processes 112a and 112b. The functions in the library may include spectrum-related functions such as, for example, functions to retrieve spectrum data from one or more spectrum data sources (e.g., data sources 106a and/or 106b), functions to update spectrum data sources, and/or functions to run spectrum-related algorithms. The functions may be configured to process various forms of spectrum data including, for example, raw (unprocessed) spectrum data, such as measured signal data, attributes of raw spectrum data, such as in-phase/quadrature (IQ) data, and processed spectrum data, such as "heat" map data indicating signal strengths at different geographic regions. This library of functions is hereinafter referred to as the "Spectrum SDK."

The Spectrum SDK may include many different types of spectrum-related functions. Further, at least one function in the Spectrum SDK may accept one or more parameters. Parameters may include, for example, data that represents a location, data for a signal sample, signal identification data, spectrum user identification data, or SA device attributes, among other things. In some embodiments, the Spectrum SDK may include at least one function that returns data as a result of being called. The returned data may include, for example, data representing a heat map showing spectrum information at various locations.

The functions in the Spectrum SDK may calculate, generate, and/or retrieve spectrum data associated with one or more parameters. Consider an exemplary function in the Spectrum SDK that accepts parameters including a location, a signal strength threshold, and a time. In this example, the function may return a list of signals that are above the signal strength threshold at the specified time around the specified location. In another example, function parameters may include a location (or a region), a device type (or operating frequency range of the device), and a time, and the function may return data that includes a list of frequency bands that are allocated for the specified time, location, and frequency range. In yet another example, function parameters may include an in-phase/quadrature (IQ) signal sample, a location where the IQ sample was measured, and a time when the IQ sample was measured. In this example, the function may return, for example, signal identifying information associated with the IQ sample and/or spectrum user information associated with the IQ sample. The signal identifying information may include, for example, a signal identification number and/or description of the signal. The spectrum user information may include, for example, a user identification number, contact information, and/or a location. The user identification information and signal identification information may be used to identify and rectify a problematic signal (e.g., contacting a user and requesting the user to turn off a signal that is causing interference). Further, the Spectrum SDK may include functions to provide detailed signal information or user information based on a signal or user identification number provided as a function parameter.

The Spectrum SDK function parameters may also include signal type information, and a function may be configured to return optimal matched-filter parameters associated with the signal type information. These matched-filter parameters may be used, for example, to configure or reconfigure a matched filter on a SA device. The reconfigured SA device may be used to locate a signal source associated with the matched-filter parameters.

Further, the function parameters also may include data representing a location of a device and attributes of the device. Based on these parameters, the function may calculate, generate, and/or retrieve a heat map showing the strength of the signal originating from the device. Alternatively, the function may calculate, generate, and/or retrieve a heat map showing signal-to-noise ratio (SNR) of the signal originating from the device (e.g., a SNR heat map). In yet another alternative embodiment, the function may calculate, generate, and/or retrieve a heat map showing potential sources of signal interference (e.g., an interference heat map).

In some embodiments, a Spectrum SDK function may generate a heat map showing expected signals at various locations. In these embodiments, the heat map may be returned as spectrum information to a SA device process 108, which may further process the heat map to show signals that are currently being sensed by the SA device. The user of the SA device may use this heat map to identify missing signals and diagnose problems.

In further exemplary embodiments, a Spectrum SDK function may calculate where the SA device needs to be located to close a signal link. In other embodiments, a function in the Spectrum SDK may calculate how far away a signal may be detected from the SA device. A function also may perform signal propagation calculations based on attributes of the SA device provided as parameters. In yet other embodiments, a function may generate a heat map showing signal emitters in the region. In these embodiments, the function may return contact and configuration information associated with each of the signal emitters.

Figure 2A:
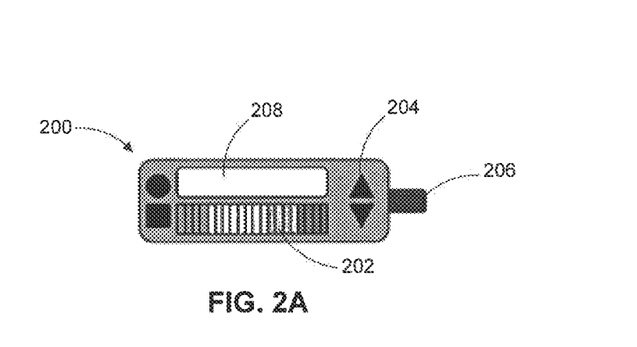
FIG. 2A illustrates an exemplary spectrum-aware (SA) device that may be used according to the disclosed embodiments of the invention.
Figure 2B:
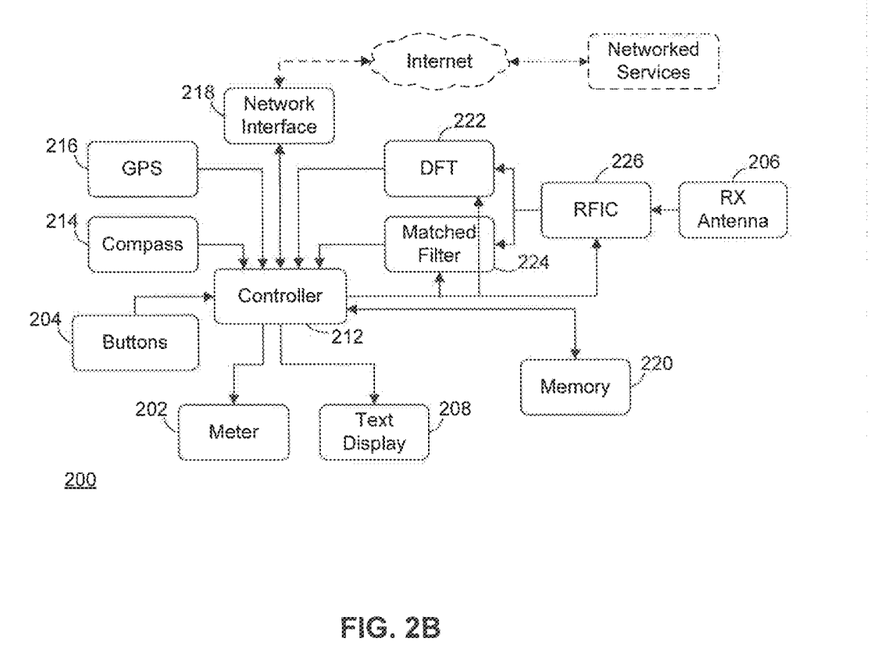
FIG. 2B is a block diagram of the SA device of FIG. 2A.

FIG. 2A illustrates an exemplary SA device 200 that may be custom built for use in the system architecture of the disclosed embodiments. The SA device 200 may include, among other things, a meter display 202, one or more buttons 204, an antenna 206, and a display 208. FIG. 2B is a block diagram of the exemplary SA device 200.

As shown in FIG. 2B, the SA device 200 may include, inter alia, a controller 212, a compass 214, a Global Positioning System (GPS) transceiver 216, a network interface 218, a memory 220, a Discrete Fourier Transform (DFT) circuit 222, a matched filter 224, and a RF integrated chip (RFIC) 226. In some embodiments, the SA device 200 may further include a USB interface or other data-transfer interfaces, an actuator (for vibrating the device), and/or a speaker.

While the illustrative SA device 200 in FIGS. 2A-B includes a text display 208, such as an LCD display, and a meter display 202, such as a scale of colored LEDs ranging from red to green, in other embodiments, the SA device 200 may include other types of displays that may be customized for displaying a specific type of spectrum information (e.g., a large LCD screen for displaying a heat map). In some embodiments, the display may be removable and/or interchangeable by the user to accommodate displaying various types of spectrum information.

In some embodiments, one or more user-actuated buttons or switches 204 may be configured to toggle through various modes of the SA device 200. In one exemplary mode, the meter display 202 may show a signal strength of a first signal, and when one of the buttons 204 is pressed, the meter display 202 may show a signal strength of a different signal. Toggling between signals using a button 104 enables the SA device 200 to display spectrum information for a large number of signals without having multiple or large display components. Therefore, the size of the SA device 200 may be minimized.

The network interface 218 may be a wireless connection module that provides a wireless connection to another device, e.g., using a Bluetooth or 802.11 protocol. In these embodiments, the SA device 200 may have a tethered access to the internet using the wireless connection module. In some embodiments, the SA device 200 may retrieve information from a connected device or remote system, such as retrieving location data from a location server that is more accurate than the location data generated locally using the GPS 216.

The antenna 206 in the SA device 200 may be removable and an antenna port may be exposed upon removal of the antenna 206.

The controller 212 may be capable of performing Fast Fourier Transform (FFT) operations, or alternatively, the SA device 200 may include a chip dedicated for performing FFT operations, such as the DFT chip 222. The controller 212 may include a processor for executing a SA device process 108, which may be stored in the memory 220. The controller 212 of SA device 200 also may implement one or more machine learning algorithms to monitor and refine the operation of the device and to improve accuracy of estimated spectrum information. In some embodiments, parameters of the matched filter 224 may be configured or reconfigured by the controller 212.

Figure 3A:
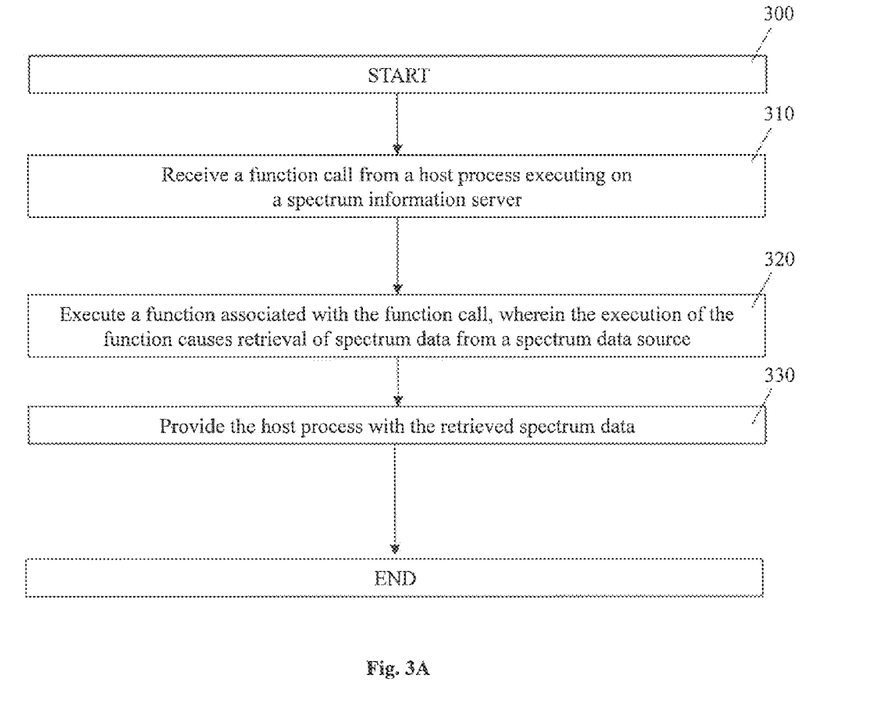
FIGS. 3A-3B are flow diagrams illustrating exemplary steps that may be performed by a process executing in a spectrum information server according to the disclosed embodiments.

FIG. 3A is a flowchart illustrating an exemplary sequence of steps 300 that may be performed by a server process 110 in the spectrum information server 104 in accordance with an embodiment of the invention. At step 310, the server process 110 receives one or more function calls from one of the SA device host processes 112a and 112b. For example, the server process 110 may receive a function call from the SA device host process 112*a* based on a spectrum information request that the SA device host process 112*a* previously received from the SA device process 108*a* in the SA device 102*a*. This spectrum information request may optionally include spectrum data gathered by the SA device.

At step 320, the server process 110 executes one or more functions of the Spectrum SDK associated with the received function call. Execution of the one or more functions may cause the server process 110 to retrieve spectrum data from a spectrum data source 106. For example, when the server process executes the function corresponding to a received function call, the result of executing the function may cause the server process to generate a database query for retrieving a specific type of spectrum data from a spectrum data source 106. The spectrum data source may execute database management software that, after receiving the database query, retrieves the requested spectrum data from a database 116 and returns the retrieved spectrum data to the server process 110.

At step 330, the server process 110 provides the retrieved spectrum data (and/or a processed form of the spectrum data) to the SA device host process 112*a* or 112*b* that sent the function call at step 310. After receiving the spectrum data from the server process, the SA device host process 112*a* or 112*b* may use the received spectrum data to generate spectrum information to return to a SA device process. For example, the SA device host process may generate the spectrum information by processing at least some of the spectrum data received from the server process and/or by performing calculations based on the received spectrum data. In some embodiments, the spectrum information generated by the SA device host process 112*a* or 112*b* may be the same as the spectrum data that it received from the server process 110.

Figure 3B:
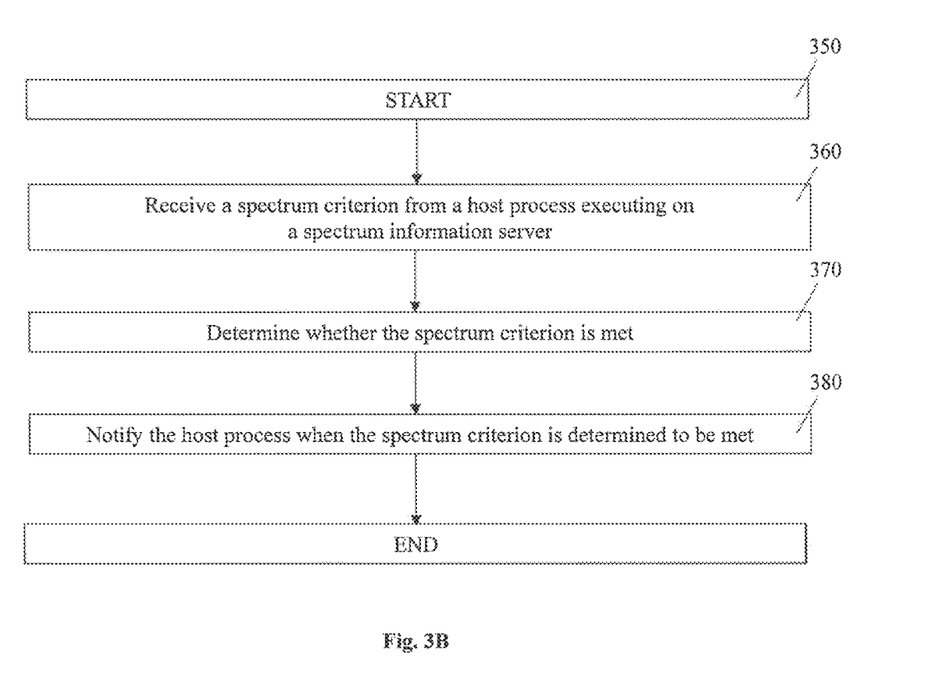

FIG. 3B is a flowchart illustrating an exemplary sequence of steps 350 that also may be performed by the server process 110. The steps shown in FIG. 3B may be combined with, or performed in parallel with, the steps disclosed in FIG. 3A. For example, the steps 360, 370, and 380 in FIG. 3B may be performed at any time during or after the method of FIG. 3A has started (e.g., during step 310).

At step 360, the server process 110 receives at least one spectrum criterion from one of the SA device host processes 112*a* or 112*b*. At step 370, the server process 110, after receiving the spectrum criterion, a determination is made whether the spectrum criterion is met. This determination may be performed by functionality in the server process 100 itself or may be performed as a result of the server process making another function call to a function in the Spectrum SDK. In some embodiments, the server process 110 may determine (or cause a function to determine) whether the spectrum criterion is met by periodically retrieving spectrum data from one or more spectrum data sources 106*a* and 106*b* and determining whether the spectrum criterion is met based on the retrieved spectrum data. In other embodiments, the server process 110 may cause a determination of whether the spectrum criterion is met by sending the spectrum criterion to one or more of the spectrum data sources 106*a* and 106*b*, which then notify the server process 110 when the spectrum criterion is met (based on spectrum data stored at the respective spectrum data source).

At step 380, the server process 110 notifies the SA device host process 112*a* or 112*b* that sent the spectrum criterion when the spectrum criterion has been determined to be met.

Figure 4A:
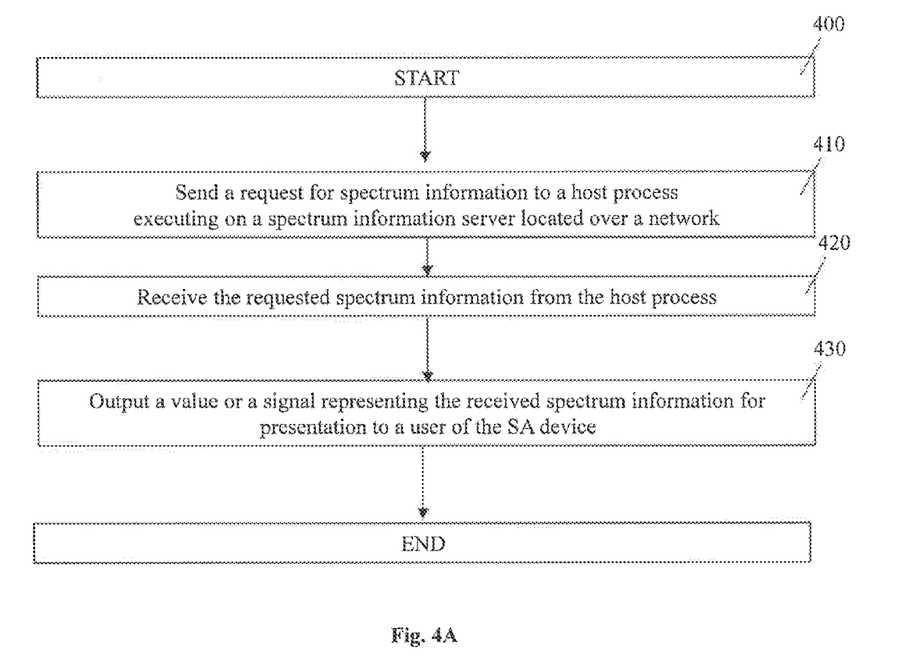
FIGS. 4A-4B are flow diagrams illustrating exemplary steps that may be performed by a process executing in an SA device according to the disclosed embodiments of the invention.

FIG. 4A is a flowchart illustrating an exemplary sequence of steps 400 that may be performed by a SA device process that provides spectrum information to a user of a SA device in accordance with the disclosed embodiments of the invention. At step 410, the SA device process 108*a* of the SA device 102*a* sends a request for spectrum information to a compatible SA device host process 112*a* running on the spectrum information server 104. At step 420, the received request for spectrum information causes the SA device host process 112*a* to send the server process 110 one or more function calls to functions in the Spectrum SDK. The execution of the one or more functions may cause the server process 110 to retrieve spectrum data from one or more of the spectrum data sources 106*a* and 106*b*. The SA device host process 112*a* returns the spectrum information to the SA device process 108*a* executing on the SA device 102*a*.

At step 430, the SA device process 108*a* may output spectrum information received from the SA device host process 112*a* using one or more of output components (e.g., on the meter display 202 or the text display 208) of the SA device. The spectrum information may be generated by the SA device host process 112*a* based on the spectrum data received from the server process 110 at step 420.

For example, the result of performing step 430 may provide the user with a list of available frequency bands or a list of available channels in a frequency band. In this example, the Spectrum SDK functions at step 420 may include a function to retrieve spectrum allocation data associated with the location of the SA device 102*a*. Additionally, the SA device host process 112*a* may generate a list of free channels based on the retrieved spectrum allocation data and return spectrum information including the list of free channels to the SA device process 108*a* for presentation to the user at step 430.

By way of further example, the exemplary sequence of steps 400 may provide the user of the SA device 102*a* with spectrum information for locating a particular signal. At step 410, in this example, executed functions in the Spectrum SDK may calculate the optimal matched-filter parameters for the particular signal, and those matched-filter parameters may be returned in the spectrum information sent to the SA device process 108*a*. The SA device process 108*a* may reconfigure the matched filter 224 of the SA device 102*a* using the matched-filter parameters provided by the function, and the signal strength detected by the reconfigured matched filter 224 may be indicated on the meter display 220.

In yet another example, the exemplary sequence of steps 400 may provide the user with information relating to the "health" (e.g., quality) of a particular signal, such as corresponding to the signal-to-noise ratio (SNR) of the signal. In this example, the requested spectrum information may include optimal matched-filter parameters associated with the particular signal. The SA device process 108*a* also may calculate a distance to the signal source by reconfiguring the matched filter 224 of the SA device 102*a* using matched-filter parameters received from a SA device host process 112*a* and further estimating an amount of signal distortion. In this example, the calculated distance may be output to the user using the meter display 220 (at step 430).

Figure 4B:
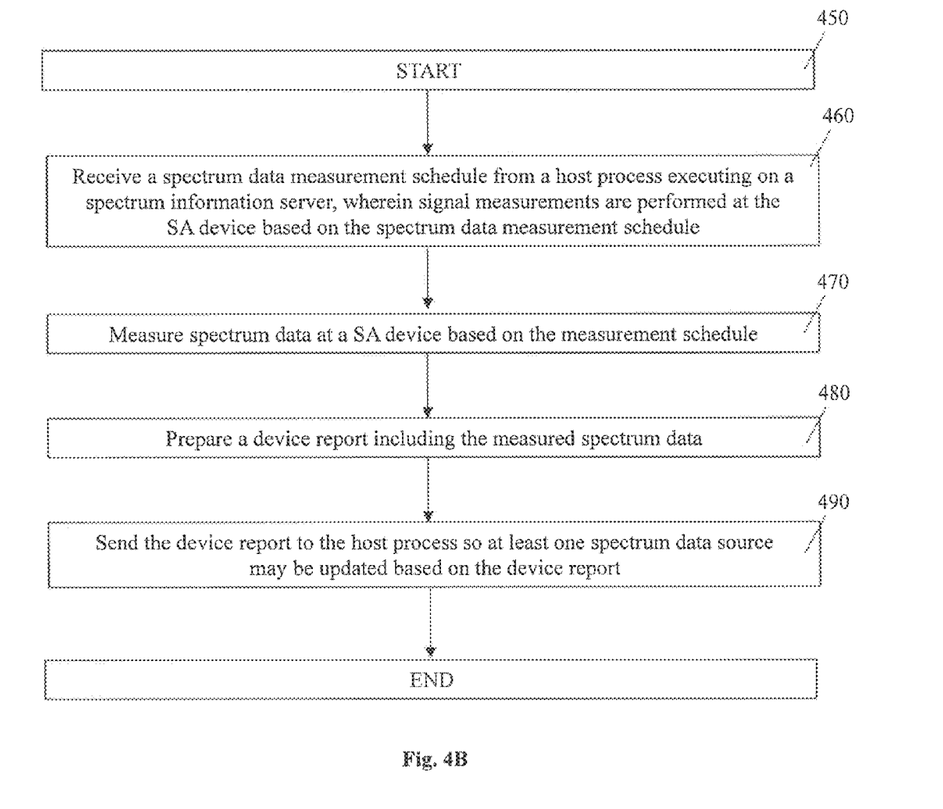

FIG. 4B is a flowchart illustrating an exemplary sequence of steps 450 that may be performed by a SA device process for updating a spectrum data source in accordance with the disclosed embodiments. The steps shown in FIG. 4B may be combined with, or performed in parallel with, the steps disclosed in FIG. 4A. For example, the steps 460, 470, 480, and 490 in FIG. 4B may be performed at any time during or after the method of FIG. 4A has started (e.g., during step 410).

At step 460, a SA device process 108a may receive a spectrum data measurement schedule from a SA device host process 112a. The measurement schedule may be generated at the SA device host process 112a based on operator input and/or attributes of the SA device 102a (e.g., spectrum sensing capability).

At step 470, the SA device process 108a may cause the SA device 102a to measure spectrum data using RF components (e.g., RFIC 226 and antenna 206) and/or sensors (e.g., compass 212 and/or GPS 216). In some embodiments, the SA device process 108a preferably causes the SA device 102a to measure spectrum data at a time determined based on the spectrum data measurement schedule received at step 460. As an example, the SA device process 108a may cause the controller 212 of SA device 102a to measure a power level in each frequency band or sub-band in a spectrum. In this example, the controller 212 of SA device 102a may use the antenna 206 and/or the RFIC 226 to measure raw signal data, and further may use the DFT chip 222 to calculate the received signal power within each frequency band or sub-band. In some embodiments, the meter display 202 of the SA device 102a may output an indication of each calculated power level for display to a user.

At step 480, the SA device process 108a may prepare a device report. The device report may include spectrum data that was measured at step 480. Alternatively, the device report may include multiple sets of measured spectrum data. In some embodiments, for example, the device report may include key performance indicators (KPI) of the SA device 102a.

At step 490, the SA device process 108a may send the device report to the SA device host process 112a. After receiving the device report, the SA device host process 112a may call one or more functions in the Spectrum SDK to update spectrum data in the spectrum data sources 106a and 106b based on the measured spectrum data included in the received device report.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for providing spectrum information using a spectrum information server that includes a server process, one or more device processes, one or more device host processes, and a spectrum software development kit (SDK), the spectrum SDK comprising a library of spectrum-related functions, the method comprising:
receiving, by the one or more device host processes, a spectrum information request from the one or more device processes;
receiving, by the server process, a function call from the one or more device host processes based on the spectrum information request;
executing a function of the spectrum SDK associated with the received function call, wherein executing the function causes the spectrum SDK to retrieve a third party's proprietary spectrum data from at least one spectrum database;
providing, by the server process, first spectrum information based on the retrieved spectrum data to the one or more device host processes; and
providing, by the one or more device host processes, second spectrum information based on the first spectrum information to the one or more device processes.

2. The method of claim 1, wherein the first spectrum information is the retrieved spectrum data.

3. The method of claim 1, wherein the second spectrum information is the first spectrum information.

4. The method of claim 1, wherein the function call includes one or more parameters.

5. The method of claim 4, wherein the parameters include an in-phase/quadrature (IQ) sample, and wherein the requested spectrum information includes at least one of a signal identifying information associated with the IQ sample and a user identifying information associated with the IQ sample.

6. The method of claim 4, wherein the parameters include a location data representing a location, and wherein the requested spectrum information includes at least one of: data representing signals present at the location, data representing spectrum allocation at the location, data representing a propagation heat map around the location, data representing a signal-to-noise (SNR) heat map around the location, and data representing an interference heat map around the location.

7. The method of claim 4, wherein the parameters include a signal type data, and further wherein the requested spectrum information includes filter parameters associated with the signal type data, the filter parameters for reconfiguring a filter in a spectrum-aware device.

8. The method of claim 4, wherein executing the function comprises at least one of calculating, generating, or retrieving spectrum data associated with the parameters.

9. The method of claim 1, further comprising:
receiving at least one spectrum criterion from the one or more device host processes;
determining whether the spectrum criterion is met; and
notifying the one or more device host processes when the spectrum criterion is determined to be met.

10. The method of claim 9, wherein determining whether the at least one spectrum criterion is met further comprises the steps of causing a spectrum data source to monitor stored spectrum information and causing the spectrum data source to notify the server process when the criterion is met during the monitoring of the stored spectrum information.

11. The method of claim 9, wherein the server process determines whether the at least one spectrum criterion is met.

12. The method of claim 1, wherein the one or more device host processes execute within respective sandbox environment within the server process.

13. The method of claim 12, wherein the sandbox environment comprises a software environment where access to computing resources is controlled by another process.

14. The method of claim 1, wherein the one or more device processes are further configured to cause a spectrum-aware (SA) device to measure spectrum information using at least one of an RFIC, an antenna, a compass, or a GPS, measure a power level in each frequency band in a spectrum, and display the measured power level on a meter display.

15. The method of claim 1, wherein the at least one spectrum database is maintained by a third party.

16. The method of claim 1, wherein the at least one spectrum database comprises a spectrum-access system (SAS).

17. A method for retrieving spectrum information at a spectrum-aware (SA) device, the method comprising:
sending a request for spectrum information to a device host process executing on a spectrum information server, the request causing the device host process to generate at least one function call to a function in a spectrum software development kit (SDK) accessible to a server process, wherein execution of the function results in retrieval of a third party's proprietary spectrum data from at least one spectrum database to generate the requested spectrum information;
receiving the requested spectrum information from the device host process; and
outputting at least one of a value or a signal representing the received spectrum information using an output component of the SA device.

18. The method of claim 17, wherein the spectrum information includes one or more filter parameters and the method further comprises reconfiguring a filter of the SA device based on the filter parameters.

19. The method of claim 17, further comprising:
sending a criterion to the device host process; and
causing the server process to notify the device host process when the criterion is met.

20. The method of claim 17, further comprising:
measuring spectrum information at the SA device;
preparing a device report including the measured spectrum information and key performance indicators (KPI) of the SA device; and
sending the device report to the device host process for updating spectrum information stored in the spectrum database based on the device report.

21. The method of claim 20, further comprising receiving a spectrum information measurement schedule from the device host process, wherein the step of measuring is performed based on the received spectrum information measurement schedule.

22. The method of claim 17, wherein the requested spectrum information includes spectrum attributes for a heat map.

23. A spectrum information server, comprising:
a memory for storing a server process, one or more device processes, one or more device host processes, and a spectrum software development kit (SDK), the spectrum SDK comprising a library of spectrum-related functions;
a processor configured to execute the server process, the one or more device processes, and the one or more device host processes, wherein the processor is configured to:
receive, by the one or more device host processes, a spectrum information request from the one or more device processes;
receive, by the server process, a function call from the one or more device host processes based on the spectrum information request;
execute a function of the spectrum SDK associated with the received function call, wherein executing the function causes the spectrum SDK to retrieve a third party's proprietary spectrum data from at least one spectrum database;
provide, by the server process, first spectrum information based on the retrieved spectrum data to the one or more device host processes; and
provide, by the one or more device host processes, second spectrum information based on the first spectrum information to the one or more device processes.

24. The spectrum information server of claim 23, wherein the first spectrum information is the retrieved spectrum data.

25. The spectrum information server of claim 23, wherein the second spectrum information is the first spectrum information.

26. The spectrum information server of claim 23, wherein the processor is further configured to send the second spectrum information over a network to one or more device processes executing on a spectrum-aware device.

27. The spectrum information server of claim 26, wherein the network is the Internet.

28. The spectrum information server of claim 23, wherein the processor is further configured to:
receive a spectrum criterion from the one or more device host processes;
determine whether the spectrum criterion is met; and
notify the one or more device host processes when the criterion is determined to be met.

29. A spectrum-aware (SA) device, comprising:
an output component for displaying at least one of a value and a signal to a user;
a memory for storing a device process; and
a processor configured to execute the device process for:
(i) sending a request for spectrum information to a spectrum information server, the request causing a device host process executing on the spectrum information server to generate at least one function call to a function in a spectrum software development kit (SDK) accessible to a server process executing on the spectrum information server, wherein execution of a function associated with the function call results in the retrieval of a third party's proprietary spectrum data from at least one spectrum database;
(ii) receiving the requested spectrum information from the device host process executing on the spectrum information server; and
(iii) outputting at least one of a value or a signal representing the received spectrum information using the output component of the SA device.

30. The spectrum-aware device of claim 29, wherein the processor is further configured to:
measure spectrum information at the SA device;
prepare a device report including the measured spectrum information; and
send the device report to the device host process for updating spectrum data stored in the spectrum database based on the device report.

31. The spectrum-aware device of claim 29, wherein the device process sends the request over a network to the device host process on the spectrum information server.

32. The spectrum-aware device of claim 31, wherein the network is the Internet.

* * * * *